United States Patent
Baronnet et al.

[15] 3,692,275
[45] Sept. 19, 1972

[54] LINE COUPLING CONNECTOR FOR RAILWAY VEHICLES

[72] Inventors: Pierre Baronnet; Ernst Katzer, both of Munich, Germany

[73] Assignee: Knorr-Bremse KG, Berlin and Munich, Germany

[22] Filed: Jan. 27, 1971

[21] Appl. No.: 110,192

[30] Foreign Application Priority Data

Feb. 24, 1970  Germany..........P 20 08 540.9

[52] U.S. Cl..................................251/149.2, 285/65
[51] Int. Cl..............................................F16k 51/00
[58] Field of Search...251/149.2, 298, 299, 300, 303; 285/65

[56] References Cited

FOREIGN PATENTS OR APPLICATIONS 1,113,298  5/1968  Great Britain

*Primary Examiner*—Henry T. Klinksiek
*Attorney*—Edmund M. Jaskiewicz

[57] ABSTRACT

A coupling device is disclosed for coupling a line to a corresponding line on a railway vehicle equipped with either an automatic central buffer coupler or a manually operated box coupler. The device may be attached to the end of an air or stream line and comprises several retaining arms and a hook which are lockingly engageable with existing structure on both the automatic coupler and the manual coupler. The device is also provided with radial closure guides which are are spaced to correspond with the closure guides on a manual line coupler and which are positionable between guide flanges surrounding an air line opening on an automatic coupler. A further device is provided for coupling a second line to an automatic coupler with the second device having a radial extension received in a recess in the underside of the first device and a pivotable hook for lockingly engaging an abutment on the automatic coupler.

8 Claims, 4 Drawing Figures

LINE COUPLING CONNECTOR FOR RAILWAY VEHICLES

During a conversion period of railway rolling stock from the presently employed manual hook coupling to the automatic central buffer coupling difficulties may be encountered in connecting the various pipe lines, such as air and steam lines, of vehicles having different couplers. Such a situation exists in Europe where it has been decided to standardize railway rolling stock to the automatic central buffer coupling. Railway vehicles which are provided with hook draft or traction couplers are generally equipped with a manually operated sleeve air coupler. Various forms of connector devices have been proposed in order to connect a manually operated sleeve air coupler to a pipe line of a railway vehicle equipped with an automatic central buffer coupler and, accordingly, with an automatic line coupler.

In the French patent of Addition No. 89 762 the end of a pipe line of a vehicle equipped with a hook coupler is divided and the divided ends are connected by means of separate shut off valves to a sleeve air coupler. A shaped or molded element is suspended in the head of the central buffer coupler so that it can be tightly connected to the automatic line coupler therewith. This shaped device is disadvantageous in that it requires at least two shut off valves, two hose lines and coupling devices in the form of a sleeve air coupler or a shaped element for each end of the vehicle and for each pipe line. Normally, only one such coupler device is necessary for the connection of the pipe line. The increased number of the coupling devices restricts the movement of railroad personnel during coupling operations and presents difficulties with respect to the arrangement of the coupler elements and in the coupling of the railway vehicle provided with several pipe lines.

The Austrian patent application A 11 334-67 discloses an arrangement for connecting the line of a railway vehicle provided with a hook coupler to a molded element that in turn is coupled to the automatic line coupler by means of a sleeve air coupler of conventional structure. According to this disclosure the railway vehicle then requires only a single shut off valve and hose line for each end of the vehicle and for each pipe line. If the vehicle is to be coupled to a vehicle having an automatic line coupler the pipe line can be connected by means of a shaped or molded element. If the vehicle to be coupled is equipped with a sleeve air coupler the line coupling is carried out after disconnecting the sleeve air coupler between the hose line and the shaped element by the connection of the sleeve air coupler of the hose line with that of the vehicle to be coupled. As result, every coupling operation may require several separate coupling steps depending upon the coupling equipment of the vehicle being coupled. In addition, the location of the shaped element introduces difficulties where the coupling must be carried out with a vehicle equipped with a sleeve air coupler since in such a situation the shaped element is free.

In this type of line coupling connector it is pointed out that the shaped element is retained on the automatic line coupler or on parts connected thereto by means of retaining extensions where the shaped element is coupled to such a coupler. In the event the draft coupler which connects the vehicles to each other should become uncoupled, excessive tensile stresses may occur in the line coupling connector which remains coupled. Such stresses may result in the damage or destruction of the line coupling connector and possibly bring about a breaking of the hose line.

It is therefore the principal object of the present invention to provide a novel and improved device for coupling different types of line couplers between railway vehicles.

It is another object of the present invention to provide a device for quickly and easily connecting air line on a railway vehicle to an air line on another vehicle equipped with either an automatic line coupler or a manually operated line coupler.

It is a further object of the present invention to provide a device for coupling several lines to the corresponding lines of a railway vehicle equipped with either an automatic line coupler or manually operated line couplers.

The objects of the present invention are achieved and the disadvantages of the prior art are eliminated by the present invention which essentially comprises a connector for coupling lines between railway vehicles. According to one aspect of the present invention there is disclosed a device for optionally coupling air lines and the like to a railway vehicle equipped with an automatic central buffer coupler having a line opening partially surrounded by guide flanges or equipped with a manually operated line coupling having radial closure guides. The device may comprise a supporting body having a cylindrical opening portion extending therefrom and a plurality of retaining means extending from the cylindrical body portion so as to be engageable with structures on the line coupler to which a line is being coupled. A plurality of radial projections are also on said cylindrical portion and are engageable with the guide flanges on an automatic central coupler. The radial projections are spaced so as to correspond to the radial closure guides on a manually operated line coupler.

The retaining means on the cylindrical opening portion may comprise substantially radially extending rod which is engageable with a recess in a coupling latch pivotably mounted on the vehicle equipped with an automatic line coupler. A further retaining means may comprise lever pivotably mounted on an arm extending laterally from the body portion with there being a hook on the end of the lever toward the automatic line coupler so as to be engageable with an abutment on the coupler. A further device may be provided for engaging a second line to another opening on the automatic line coupler. The second device is provided with a radial extension which is received in a recess in the underside of the above-mentioned device and is provided with a pivotable hook for engaging a structure on the automatic line coupler.

A modification of the connector device is also provided for use with an automatic line coupler having a protection flap which is pivotably mounted to a line opening when the line opening is not connected.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
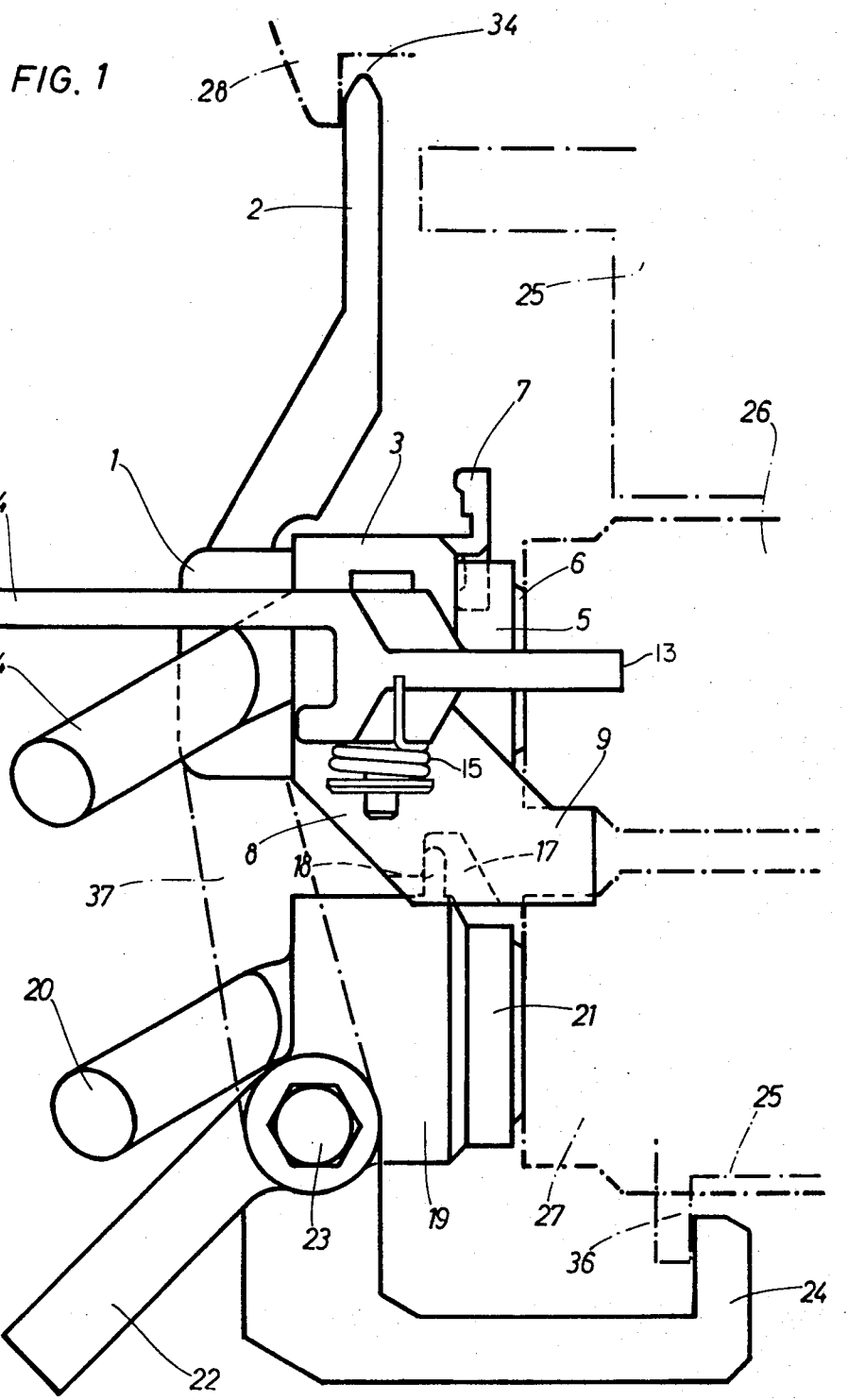
FIG. 1 is a side elevational view of a device coupling two pipe lines to an automatic line coupler according to the present invention.
Figure 2:
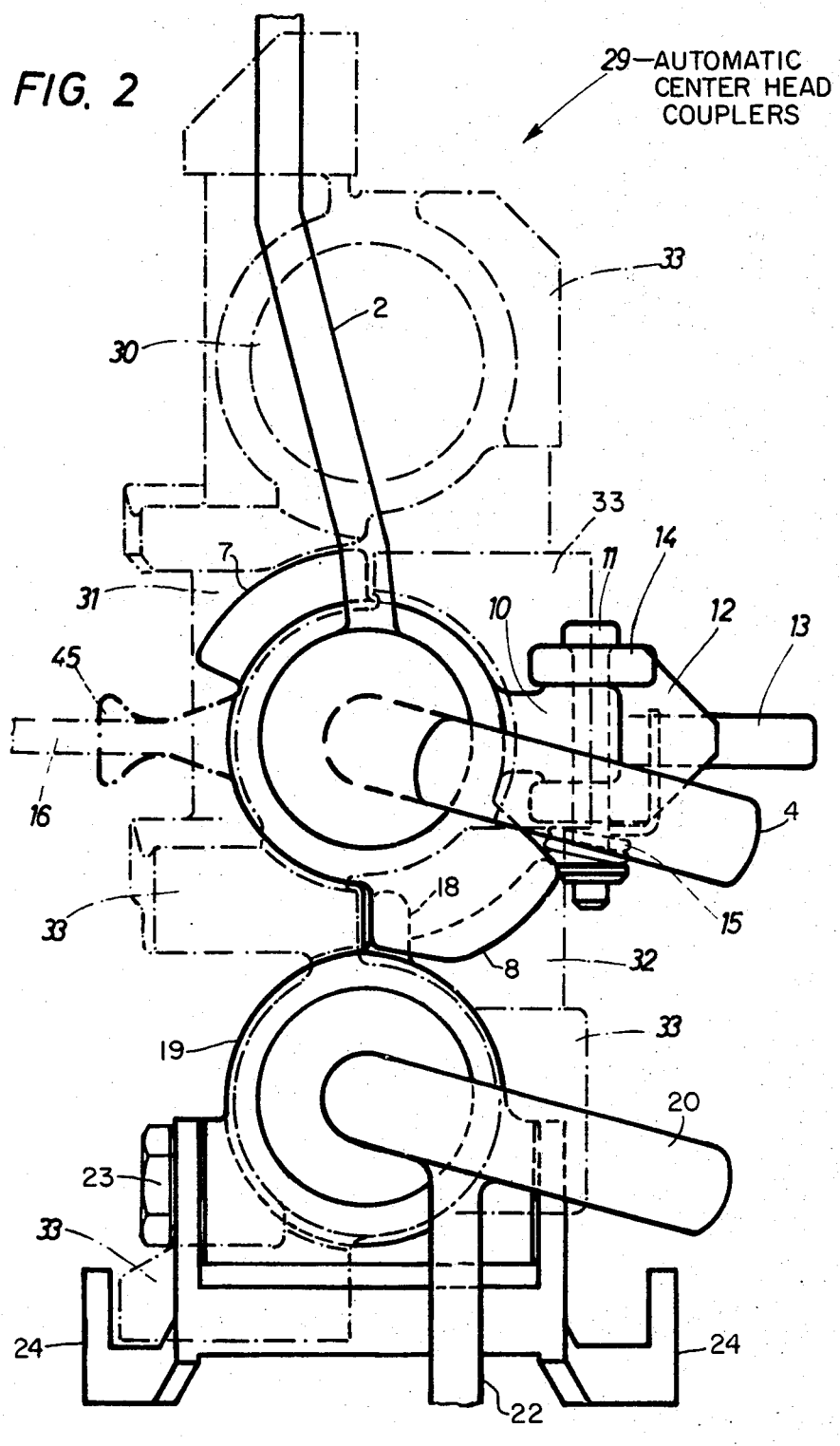
FIG. 2 is a rear elevational view of the coupling device shown in FIG. 1.
Figure 3:
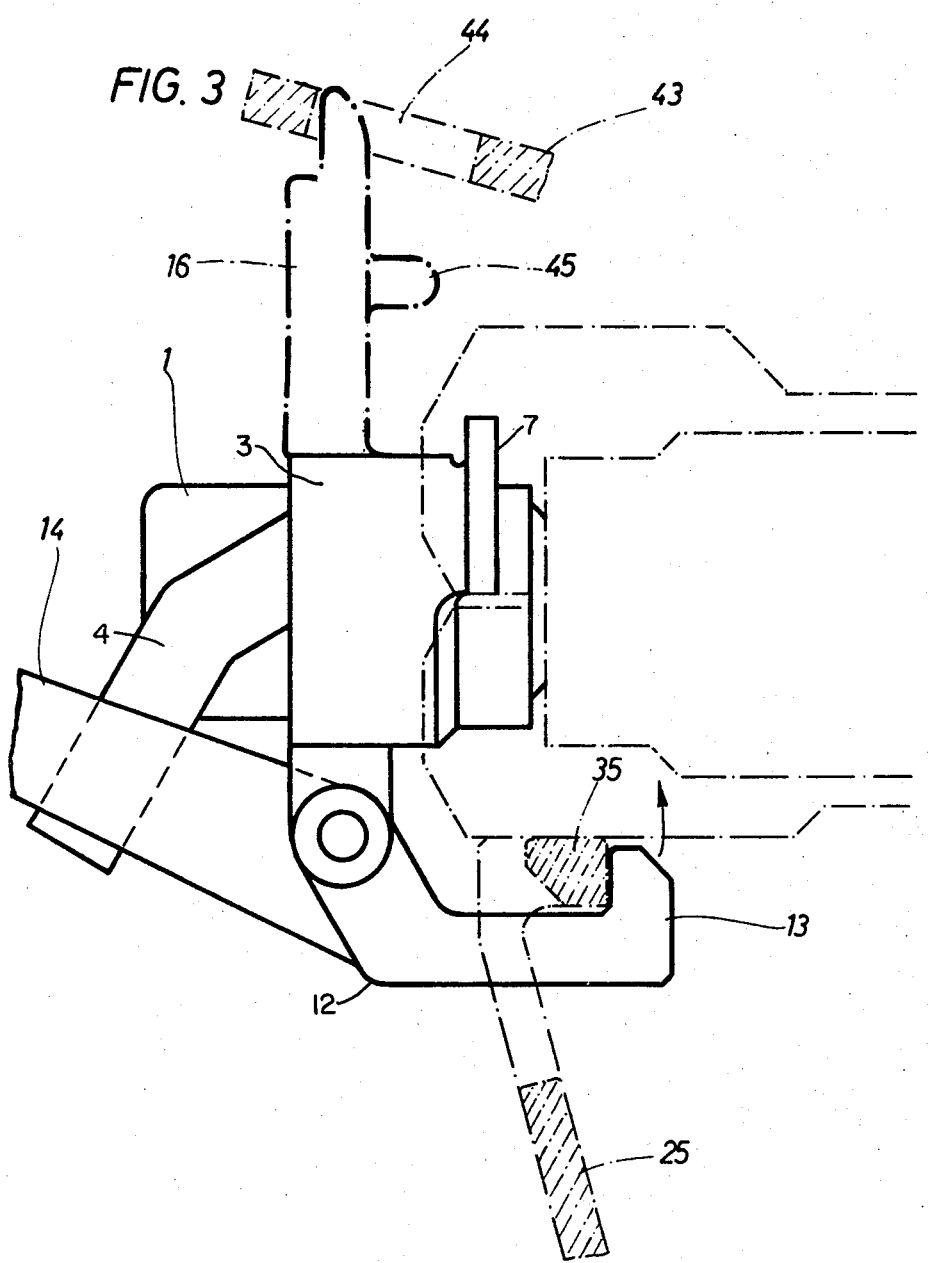
FIG. 3 is a top plan view of the coupling device shown in FIG. 1.

As may be seen in FIGS. 1–3, the coupling device according to the present invention comprises a supporting body 1 from which a rigid supporting extension bracket or rod 2 extends vertically upward. A substantially cylindrical opening portion 3 is fixedly connected to said body portion and has connected to its rear face a tubular member 4 which is connected to the pipe line to be coupled and on its front face is provided with a tubular coupling mouth piece 5 which is displaceably mounted but sealed with the opening portion. A sealing ring 6 is carried within the mouth piece 5 and is sealingly engageable with a line opening in an automatic line coupler.

The cylindrical opening portion 3 is provided with diametrically opposed radial projections 7 and 8. The projection 7 corresponds with and is similar in structure to the flange-like closure guide of a conventional manually operated air line coupler, with respect to both its shape and its position with respect to the coupler sealing ring 6. The radial projection 8 also corresponds substantially in shape and location to the hook-like closure guide of a conventional sleeve air coupling. The projection 8 is further provided with an extension 9 which projects forwardly beyond the opening of the coupler at 6 in the direction toward the automatic line coupler.

The cylindrical opening portion 3 is provided with a laterally extending bracket 10 upon which is pivoted a bifurcated end of a hook lever 12 by means of a vertical pin 11. The hook lever 12 has a hook 13 on its end projecting toward the automatic line coupler and on the other end is provided with a handle 14 which may be substantially an extension of the hook lever 12. The hook 13 of the lever 12 is urged into a locking position or counterclockwise as viewed in FIG. 3 by a coil spring 15 positioned on pin 11.

Extending laterally from the opening portion 3 opposite the bracket 10 there may be provided a rigid guide element 16 which may be positioned in substantially a radial position. When the guide element 16 is employed, the supporting bracket 2 is not necessary and may be omitted.

The bracket or arm 10 with hook lever 12 and a guide element 16 constitute additional retaining structures. The radial projection 8 is provided with a recess 17 in the underside thereof so as to open downwardly in a vertical position. The recess 17 is engaged by a radially projecting extension 18 on a pipe line coupler head 19 to which is connected a tubular member 20 leading to a second line which is to be coupled. The coupler head 19 is further provided with a coupling mouth piece 21 which corresponds to the mouth piece 5 described above and is similarly sealingly and displaceably positioned in the coupler head.

A handle 22 is pivotably mounted by a substantially horizontal pin 23 on the coupler head 19 and has a forked hook portion 24 extending forwardly therefrom as may be seen in FIG. 1.

In FIGS. 1 and 2 the coupler device in the present invention is shown as being coupled to an automatic line coupler such as would be employed with an automatic central buffer coupler head on a railway vehicle. Those components of the central buffer coupler that are essential for mounting of the device are illustrated in dot-dash lines. The central coupler essentially comprises a housing 25 having an automatic line coupler for two pipe lines 26 and 27. A coupling latch 28 is pivotably mounted on the housing 25 for pivotable movement in a longitudinal direction with respect to the coupler and having a forward coupling position and a rearward uncoupling position according to the usual structure for such central couplers.

As may be seen in FIG. 2 the automatic line coupler is indicated generally at 29 and may comprise an additional section 30 having a line opening for connection to a further line on another railway vehicle. The automatic line coupler 29 is provided with additional coupler sections 31 and 32, positioned below the section 30, for coupling pipe lines 26 and 27. Adjacent the edges of the respective sections 30, 31 and 32 there are provided guide flanges 33 which project outwardly beyond the openings of the automatic line coupler 29.

The coupling latch 28 is provided with a recess 34 in its underside which can receive the extension bracket 2.

The automatic line coupler housing 25 is further provided with an abutment 35 positioned laterally of line 26 and near the opening thereof so as to be engageable by hook 13 on the hook lever 12.

Also provided on the housing 25 are vertically downwardly projecting stops 36 which are positioned laterally and below the pipe line 27 and are engageable by the hook element 24. A wall of the housing 25 indicated at 43 may be provided with an opening 44 positioned laterally of pipe line 26 with the opening being engageable with guide element 16 when this element is employed.

In the operation for coupling lines 4 and 20 to the corresponding lines in an automatic line coupler, the retaining bracket 2 is first introduced obliquely from the lowered forward position into recess 34 of the coupling latch 28 which is in the coupling position as illustrated in FIG. 1. Alternatively, if the guide element 16 is employed in place of bracket 2 then the guide element 16 is introduced into the opening 44 on housing 25. During this operation the coupling head 19 is not connected. The coupler device is then pivoted about the engagement point of bracket 2 in recess 34 into position against the opening of pipe line 26 until hook 13 of hook lever 12 snaps behind the abutment 35 under the tension of coil spring 15. During this pivoting procedure, radial projections 7 and 8 are brought into position between guide flanges 33 of the automatic line coupler and assure a precise centering of the coupler device.

In order to uncouple the coupler device the handle 14 is pivoted to release hook 13 from abutment 35 and the device then pivoted about the engagement point of bracket 2 on coupling latch 28 or of guide element 16 on the opening 44. The coupler device can then be separated from the automatic line coupler by means of an oblique forward and downward movement.

When the retaining bracket 2 is employed the coupler device can be uncoupled also by pivoting coupling latch 28 into its uncoupling position. Under this pivoting action the recess 34 is released from the end of the bracket 2 and the coupler device then drops from the automatic line coupler 29. It is thus apparent that the coupler device can be uncoupled simultaneously with the uncoupling of the draft coupler between the railway vehicles.

If the draft coupler is unintentionally uncoupled while the lines as described above remain connected and the uncoupled vehicles move apart from each other, a traction force will be exerted toward the left as seen in FIG. 1 on the hose line 4. This traction force is partially transmitted by the extension bracket 2 to the coupling latch 28 and as soon as this force exceeds a certain value the latch 28 will be pivoted from its illustrated coupling position into its rearward uncoupling position. As result, the extension bracket 2 is able to slide from the recess 34 and the coupler device will drop off from the automatic line coupler as described above.

When a second line, such as 20, is to be coupled to line 27 of the automatic line coupler 29 the radial extension 18 of coupler head 19 is introduced from below into the recess 17 on extension 8. The hook element 24 is then latched onto abutment 36. The hook element 24 together with the radial extension 18 retain coupler head 19 tightly engaged against the line opening of pipe line 27.

When it is desired to uncouple lines 4 and 20 from the automatic line coupler 29 the coupler head 19 is first uncoupled by releasing hook 24 by pivoting the handle 22 upwardly and the coupler 19 is then removed by disengaging the radial extension 18 from recess 17. Line 4 is then uncoupled as described above. In the event that the draft couplers between the vehicles unintentionally uncouple, the coupler head 19 will also drop off in the same manner as in the case of the coupler device as described above.

If the two lines 4 and 20 are to be regularly coupled together to another railway vehicle it may be desireable to connect coupler head 19 rigidly to the body portion 1 of the coupler device. This may be achieved by a bracket 37 indicated in FIG. 1 which extends from body portion 1 to coupler 19. The hook element 24 may then be omitted since the coupler head 19 will be fixedly attached to the coupler device of line 4.

Figure 4:
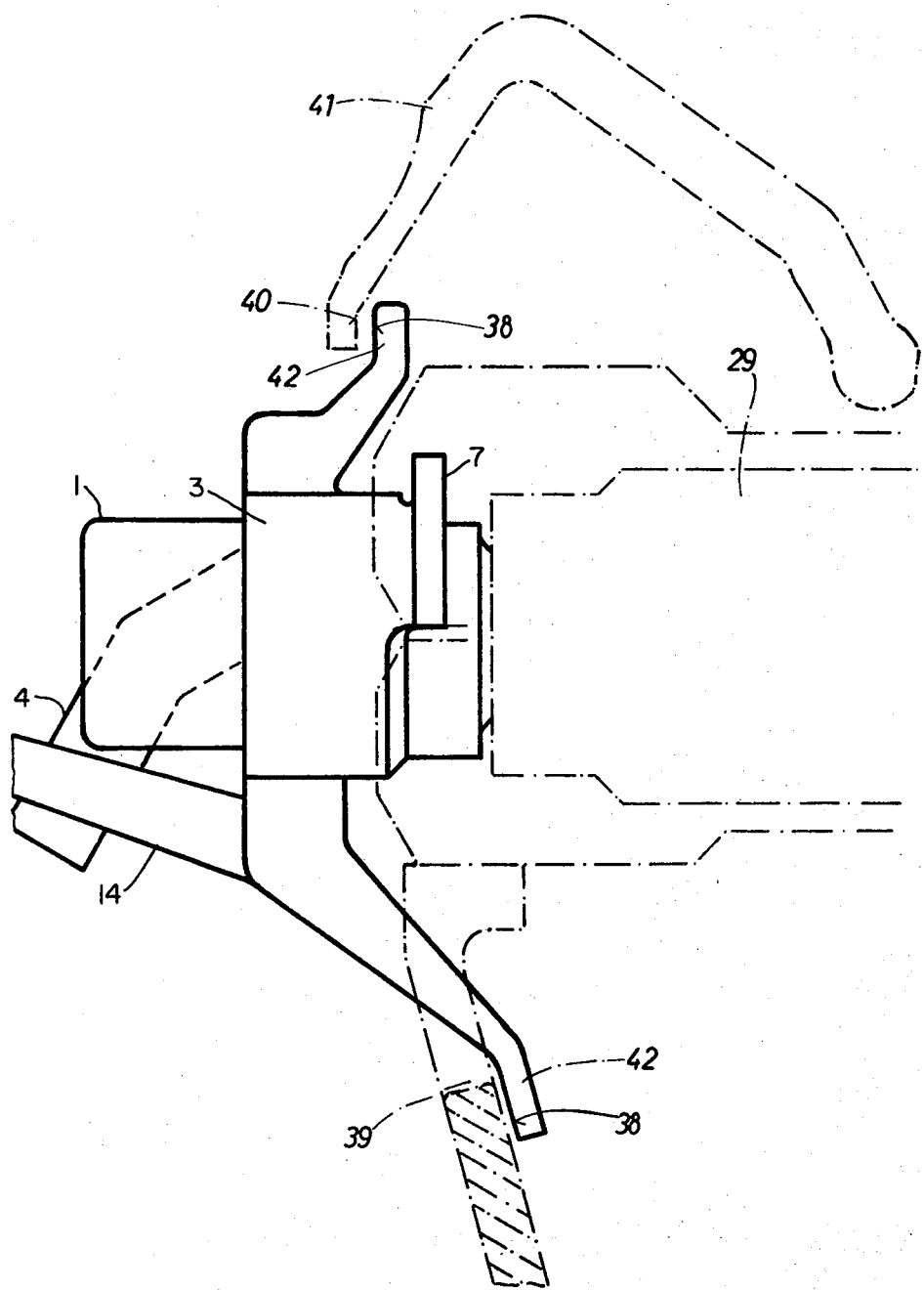
FIG. 4 is a top plan view similar to that of FIG. 3 of a modification of the coupling device of the present invention.

In FIG. 4 there is illustrated a modification of the present invention wherein the coupler device may be provided with laterally extending abutment surfaces 38 having retaining surfaces 42 in place of guide element 16 and hook element 12. In the coupled position as seen in FIG. 4 one abutment surface 38 contacts an abutment surface 39 on housing 25 of the automatic line coupler and the other abutment surface 38 contacts a surface 40 on the inner or closure side of a protection flap 41 pivotably mounted on the automatic line coupler 29. The flop 41 is pivoted laterally outwardly to release the line opening of automatic line coupler 29 in the customary manner. This structure assures a ready automatic release of the connector device from the automatic line coupler or from the automatic central buffer coupling in the event a traction force between the coupler device and automatic line coupler exceeds a certain limit. When this traction force limit is exceeded, the flap 41 will be pivoted further outwardly and abutment surface 38 will be released from surface 40. As result, the coupler device will drop off from the automatic line coupler.

As shown in FIGS. 1 and 2, the laterally extending guide element 16 may be provided with an extension 45 projecting toward the automatic line coupler. During the coupling operation with the automatic line coupler 29 the extension 45 functions to urge the projection flap 41 outwardly and to retain the projection flap in this open position as shown in FIG. 4.

When it is desired to couple lines 4 and 20 to a railway vehicle equipped with the conventional sleeve air couplers the coupling head thereof is pressed onto the opening of the coupler device and pivoted through a small angle in the usual manner so as to engage 83 radial projections 7 and 8. It is thus apparent that the coupling procedure with respect to a railway vehicle equipped with a conventional manual air coupler is carried out in the same manner as if both vehicles were equipped with these couplers.

Two coupler devices according to the present invention can also be coupled together by means of their respective radial projections 7 and 8 as described above. In such an operation the projections 7 and 8 function in the same manner as the radial closure guides of two manual air couplers.

Thus it can be seen that the present invention has disclosed a coupler device for connecting lines to a railway vehicle equipped with either of different line couplers. The coupler device overcomes the disadvantages of previous known devices in that only a minimum number of parts must be positioned together to perform a coupling operation, there are no unnecessary elements present when the coupler device is coupled and no additional coupling operations must be performed during or prior the actual coupling procedure. In addition, the connector device of the present invention provides for automatic uncoupling should excessive tension forces be exerted on coupled lines in the event the railway vehicles should become unintentionally uncoupled. The present invention also provides for coupling a second line on a vehicle to a railway vehicle equipped with either an automatic line coupler or a conventional manually operated air coupler.

It is understood that this invention is susceptible to modification in order to adapt it to different usages and conditions and, accordingly, it it desired to comprehend such modifications within the invention as may fall within the scope of the appended claims.

What is claimed is:

1. A device for optional coupling of air lines and the like to a railway vehicle equipped with an automatic central line coupler having a line opening partially surrounded by a guide flanges or equipped with a manually operated line coupler having radial closure guides, and comprising a supporting body having a cylindrical portion extending therefrom, there being a line opening in said cylindrical portion, a plurality of retaining means extending laterally from said cylindrical portion for engaging structure adjacent the line coupler to which a line is being coupled, and a pair of radial projections on said cylindrical portion and engageable with the guide flanges on an automatic central line coupler, said radial projections being spaced to correspond to the radial closure guides of a manually operated coupler.

2. A device as claimed in claim 1 and comprising a coupling latch pivotably mounted on the automatic central buffer coupler and pivotable longitudinally of the coupler between coupled and uncoupled positions, there being a recess in the underside of said coupling latch and engageable by one of said retaining means when the coupling device is positioned on an automatic central line coupler.

3. A device as claimed in claim 2 wherein one of said retaining means comprising a substantially vertical rod extending upwardly from said cylindrical opening portion, the upper end of said rod being received within said recess when said coupling latch is in the coupled position.

4. A device as claimed in claim 1 wherein there are first and second retaining means, said first retaining means comprising a substantially vertical rod extending upwardly from said cylindrical opening portion, said second retaining means comprising an arm extending laterally from a side of said cylindrical opening portion and having a lever pivotably mounted thereon, there being a hook on the end of said lever toward the coupler to which the device is being coupled and engageable with an abutment on that coupler.

5. A device as claimed in claim 1 wherein there are first and second retaining means, said retaining means comprising a bracket extending laterally from one side of said cylindrical opening portion, said second retaining means comprising an arm extending laterally from the other side of said cylindrical opening portion and having a lever pivotably mounted thereon, there being a hook on the end of said lever toward the coupler to which the device is being coupled and engageable with an abutment on that coupler.

6. A device as claimed in claim 1 and comprising a line opening protection flap pivotably mounted on the automatic central coupler and releasing automatically from the line opening to an open position upon a coupling operation, and a supporting arm defining one of said retaining means and extending laterally of said cylindrical opening portion to engage the side of said flap toward said line opening when the flap is pivoted to its open position.

7. A device as claimed in claim 1 wherein the lower one of said radial protections comprises a forwardly extending guide engageable between the guide flanges of an automatic central line coupler.

8. A device as claimed in claim 7 wherein said forwardly extending guide has a recess in the underside thereof, a line coupler head having a radial extension thereon engageable with said guide recess when coupled to a second line opening in an automatic central coupler, and a hook pivotably mounted on said line coupler head and engageable with structure on said automatic central coupler.

* * * * *